Oct. 22, 1957 W. W. WALLACE 2,810,501
COIN CONTAINER FOR GLOVE COMPARTMENTS
Filed Feb. 7, 1955
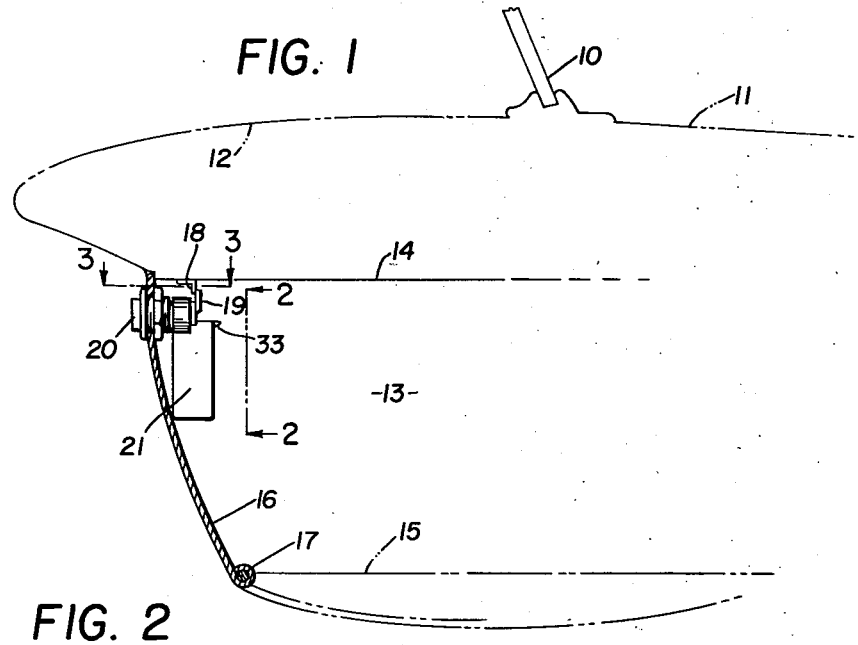
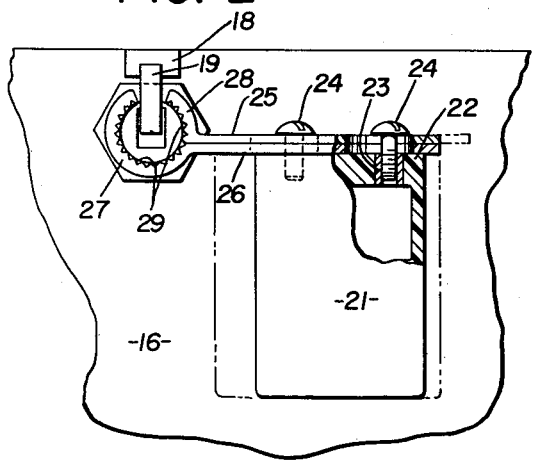
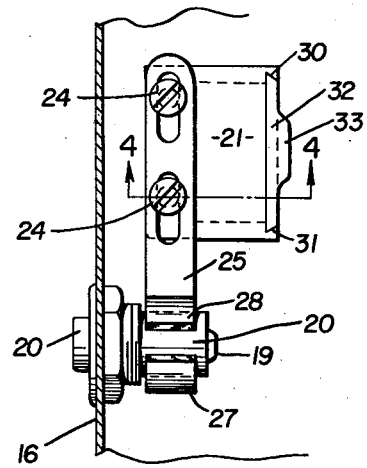
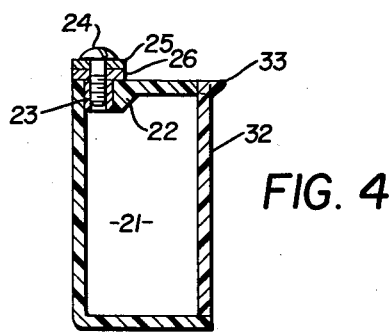
INVENTOR.
WAYNE W. WALLACE
BY
ATTORNEY

United States Patent Office 2,810,501
Patented Oct. 22, 1957

2,810,501

COIN CONTAINER FOR GLOVE COMPARTMENTS

Wayne W. Wallace, Youngstown, Ohio

Application February 7, 1955, Serial No. 486,504

1 Claim. (Cl. 224—29)

This invention relates to a coin container that may be positioned in a glove compartment of an automobile by securing the same to the cylinder of the latch mechanism of said glove compartment.

The principal object of the invention is the provision of a simple and inexpensive coin container and means for attaching the same to the lid of a glove compartment.

A further object of the invention is the provision of a coin container having a two-part clamp adjustably secured thereto and engageable upon the latch mechanism of the glove compartment lid.

A still further object of the invention is the provision of a coin container comprising a convenient and readily accessible device attachable to the lid compartment of an automobile so that coins for parking meters, etc., may be conveniently kept at hand.

A still further object of the invention is the provision of a coin container adapted to be attached to the lid of a glove compartment of an automobile so that the container is in one position when the glove compartment lid is open and another when it is closed and so that the coins may be prevented from rattling about in the container.

The coin container disclosed herein comprises an inexpensive, conveniently attached device that may be located on the inner side of a lid of a glove compartment of an automobile and thereby readily accessible when the glove compartment lid is opened and adapted to receive and retain coins such as necessary for use in parking meters, telephones and the like.

The coin container disclosed herein is universally applicable to glove compartment lids by reason of its novel mounting means enabling it to be clamped to the catch and lock cylinder of the glove compartment lids.

Figure 1 is a cross section of a portion of an automobile body including a glove compartment and the lid thereon and illustrating the coin container in association therewith.

Figure 2 is a plan view on an enlarged scale taken on line 2—2 of Figure 1.

Figure 3 is a top plan view on an enlarged detail taken on line 3—3 of Figure 1.

Figure 4 is a horizontal section taken on line 4—4 of Figure 3.

By referring to the drawings and Figure 1 in particular it will be seen that a portion of an automobile body is disclosed including a windshield 10, hood 11 and the section 12 normally overlying the instrument panel. A glove compartment 13 is formed in the section 12 adjacent the instrument panel (not shown) and is defined by upper and lower walls 14 and 15, respectively.

A lid 16 for the glove compartment is hinged to the same by a hinge 17 and is movable on the axis of the hinge downwardly and outwardly from the closed position illustrated in Figure 1 of the drawings. The upper wall 14 of the glove compartment has a depending member 18 which serves as a means against which a keeper 19 on a latch cylinder 20 may be engaged to retain the glove compartment lid 16 in closed relation, as shown.

A coin container comprising a box 21 having a two-part adjustable clamp attached thereto is secured to the latch cylinder 20 so that it is in vertical position when the glove compartment lid 16 is closed and in horizontal position when the lid 16 is opened.

By referring to Figures 2 and 3 of the drawings it will be observed that the coin container 21 has a thickened upper end portion 22 including spaced tapped openings 23 into which a pair of fasteners 24—24 may be threadably engaged. A pair of superimposed slotted arms 25 and 26 are secured to the upper end of the coin container 21 by the fasteners 24, the outermost ends of the arms 25 and 26 being formed into oppositely disposed arcuate sections 27 and 28, respectively, and the inner surfaces of the arcuate sections 27 and 28 are serrated as at 29. The arms 25 and 26 with their oppositely disposed arcuate end sections 27 and 28 are thus capable of being positioned on the opposite sides of the cylinder portion of the latch 20 which extends into the glove compartment 13 on the inside of the lid 16. When the same are held in clamped relation on the latch cylinder and the fasteners 24 secured tightly to the coin container 21, the same is rigidly mounted to the lid of the glove compartment and, as all glove compartments are provided with latches including internally extending cylinders mounting the variably positioned keepers, the coin container is thus universally applicable to various automobiles.

The coin container 21 is preferably formed as a molded section with the innermost portion thereof open and the edges thereof undercut, as best seen in Figure 3 of the drawings, the undercut edges being indicated by the numerals 30 and 31. A lid portion 32 having edges beveled to match the undercut edges 30 and 31 and of slightly smaller size is thus slidably positioned in the undercut edges 30 and 31 and forms a practical and efficient closure for the coin container 21.

The lid portion 32 is preferably provided with a raised lip or handle 33 which permits the lid 32 to be slid forwardly and outwardly when the glove compartment lid 16 is in open horizontal position, thus rendering the device extremely simple and convenient in use.

It will be obvious to those skilled in the art that the entire device may be formed of metal or other material rather than of molded plastic, as hereinbefore specified, it being understood that the arms 25 and 26 may be of relatively small cross sectional area when formed of metal and will be increased appropriately when formed of other materials and particularly non-metallic materials.

Alternatively, the arms may be formed of a single piece of material bent upon itself and looped over the cylinder portion of the latch 20. When formed of some materials, suitable pressure adhesives may be utilized on the portions bearing against the cylinder of the latch mechanism to insure frictional contact therewith.

The device may be easily and inexpensively formed, readily attached to the glove compartment latch and will be found to be convenient in use and thereby provide a convenient place for retaining coins for parking meters, telephones, etc.

It will thus be seen that the several objects of the invention have been met by the coin container for glove compartments disclosed herein.

Having thus described my invention, what I claim is:

A coin container comprising a housing including a back wall having integral side, bottom and top walls, said top wall being in part relatively thicker than said back, side and bottom walls and having tapped openings in its uppermost surface, said side and bottom walls extending forwardly of said top wall, said side walls having oppositely disposed channels formed therein and a closure panel slidably disposed in said channels and forming a front wall, means for securing said container to the cylindrical lock on the inner side of a glove compartment door in an automobile, said means comprising a pair of flat rigid arms positioned one on the other, each of said arms having longitudinally extending slots therein in registering relation with one another, bolts positioned through said slots and engaged in said tapped openings in said top wall for clamping said arms together and holding them to said container, the outer ends of said arms having oppositely disposed arcuate sections for partially encircling said cylindrical lock, the inner surfaces of said arcuate sections being serrated.

References Cited in the file of this patent

UNITED STATES PATENTS

| | | |
|---|---|---|
| 2,467,762 | Marshalka | Apr. 19, 1949 |
| 2,487,897 | Rozsa et al. | Nov. 15, 1949 |
| 2,589,349 | Diefenbach | Mar. 18, 1952 |
| 2,610,085 | Zeeb | Sept. 9, 1952 |
| 2,662,715 | McKnight | Dec. 15, 1953 |